United States Patent [19]

Terasaka et al.

[11] Patent Number: 4,729,220
[45] Date of Patent: Mar. 8, 1988

[54] AIR/FUEL RATIO CONTROL SYSTEM FOR LEAN COMBUSTION ENGINE USING THREE-WAY CATALYST

[75] Inventors: Katsunori Terasaka, Yokosuka; Makoto Saitoh, Yokohama, both of Japan

[73] Assignee: Nissan Motor Co., Ltd., Yokohama, Japan

[21] Appl. No.: 29,603

[22] Filed: Mar. 12, 1987

[30] Foreign Application Priority Data

Mar. 20, 1986 [JP] Japan ................... 61-64557

[51] Int. Cl.[4] ........................... F01N 3/20
[52] U.S. Cl. ........................... 60/285; 60/276; 60/277
[58] Field of Search ............ 60/276, 285, 277

[56] References Cited

U.S. PATENT DOCUMENTS

| | | | |
|---|---|---|---|
| 4,099,491 | 7/1978 | Reddy | 60/285 |
| 4,148,188 | 4/1979 | Tokura | 60/285 |
| 4,192,140 | 3/1980 | Yamashita | 60/285 |
| 4,319,451 | 3/1982 | Tajima | 60/285 |
| 4,376,369 | 3/1983 | Horikoshi | 60/285 |
| 4,526,001 | 7/1985 | Burns | 60/285 |
| 4,617,794 | 10/1986 | Fujitani | 60/285 |

OTHER PUBLICATIONS

Nainen Kikan, vol. 23, No. 12, (1984), S. Matsushita et al., pp. 33–40.

*Primary Examiner*—Douglas Hart
*Attorney, Agent, or Firm*—Schwartz, Jeffery, Schwaab, Mack, Blumenthal & Evans

[57] ABSTRACT

The invention relates to a control system for feedback control of the air/fuel ratio in an internal combustion engine which uses a three-way catalyst to purify the exhaust gas, and which may be an automotive engine, by using an exhaust sensor to detect actual values of air/fuel ratio in the engine. The control system has the function of varying the target value of air/fuel ratio according to operating conditions of the engine such that the target value becomes super-stoichiometric at least in a portion of a steady zone of the engine operating conditions. The control system includes means to detect the temperature of the three-way catalyst and means to vary the feed of fuel or air to the engine when the catalyst temperature is above a predetermined level, e.g. 750° C., while the target value of the air/fuel ratio is super-stoichiometric such that the actual air/fuel ratio decreases to a predetermined value, e.g. stoichiometric value, which is optimum for the activities of the three-way catalyst, or to a still lower value. Such intentional change in the air/fuel ratio under the high exhaust temperature condition is effective in preventing early deterioration of the three-way catalyst.

6 Claims, 5 Drawing Figures

AIR/FUEL RATIO CONTROL SYSTEM FOR LEAN COMBUSTION ENGINE USING THREE-WAY CATALYST

BACKGROUND OF THE INVENTION

This invention relates to a system for feedback control of the air/fuel ratio in an internal combustion engine, usually an automotive engine, which is to be normally operated with a lean mixture and which uses a conventional three-way catalyst for reducing exhaust emission. The control means includes means to intentionally decreasing the air/fuel ratio under predetrmined operating conditions of the engine.

Recent automotive engines have to satisfy severe requirements as to high power performance, low exhaust emission and good fuel economy all together. One approach to the solution of problems related to such conflicting requirements is operating the engine with a very lean air-fuel mixture under precise control of the fuel feed system.

For example, a lean combustion automotive engine system is described in "NAINEN KIKAN" (a Japanese journal), Vol. 23, No. 12 (1984), 33–40. This system includes an air/fuel ratio feedback control system, which uses an oxygen-sensitive solid electrolyte device as an exhaust sensor to detect the actual air/fuel ratio in the engine, and a three-way catalyst which catalyzes not only oxidation of CO and HC but also reduction of NOx. The output of the exhaust sensor used in this system becomes nearly proportional to the actual air/fuel retio over a wide range which extends from a slightly sub-stoichiometric ratio to an extremely super-stoichiometric ratio, so that feedback control of the air/fuel ratio can be performed with widely variable target value. As a typical example, the target value of air/fuel ratio in the feedback control system is 21.5 during steady-state operation of the engine and changes to 22.5 under gently accelerating conditions, to 15.5 under idling conditions and to a sub-stoichiometric value in the range of about 12-13 under full-load operating conditions.

The use of a very lean mxture is very effective in reducing the emission of NOx to a level that meets the current regulations. The three-way catalyst incorporated in the engine system exhibits its activities while the air/fuel ratio is decreased from a super-stoichiometric range. Conventional three-way catalysts use a combination of noble metals of the platinum group and usually include rhodium Rh as an essential element.

When a three-way catalyst is used in combination with an air/fuel ratio feedback control system for performing controlled lean-combustion, it is not seldom that the activities of the three-way catalyst deteriorate in a relatively short period of time.

SUMMARY OF THE INVETNION

It is an object of the present invention to provide an improved system for feedback control of the air/fuel ratio in an internal combustion engine using a three-way catalyst, which may be an automotive engine and is operated with a lean air-fuel mixture at least during predetermined steady-state operation, which control system includes a new means to intentionally change the air/fuel ratio from the target value of feedback control when the engine is operating under a predetermined specific condition to thereby prevent early deterioration of the three-way catalyst.

To accomplish the above object the present invention proposes to decrease the air/fuel ratio, if the temperature of the three-way catalyst becomes above a predetermined temperature while the target value of feedback control of the air/fuel ratio is super-stoichiometric, to a predetermined value optimum for the activities of the three-way catalyst or to a still lower value.

More definitely, the invention provides a control system for feedback control of the air/fuel ratio of an air-fuel mixture supplied to an internal combustion engine which uses a three-way catalyst for purifying the exhaust gas, the control system comprising air/fuel ratio detection means for detecting actual values of air/fuel ratio in the engine, load detection means for detecting the load under which the engine is operating, temperature detection means for detecting the temperature of the three-way catalyst and control means for performing feedback control of the feed of fuel or air to the engine based on the detected actual values of air/fuel ratio. This control means comprises target value setting means for determining a variable target value of the air/fuel ratio according to information obtained by the load detection means such that the target value becomes higher than the stoichiometric air/fuel ratio at least in a portion of a steady zone of operating conditions of the engine and modification means for varying the feed of fuel or air to the engine when the temperature of the three-way catalyst is above a predetermined temperature while the target value of feedback control of the air/fuel ratio is higher than the stoichiometric ratio such that the actual air/fuel ratio decreases to a predetermined value which is optimum for the activities of the three-way catalyst or to a still lower value.

The air/fuel ratio control system according to the invention is very suitable for application to automotive engines.

We have discovered that the primary reason for rapid deterioration of the three-way catalyst used in known lean combustion engine systems is that rhodium as the essential element of the three-way catalyst rapidly deteriorates in its catalytic activity when lean-combustion is continued while the exhaust temperature is so high that the temperature of the three-way catalyst is above 750° C. The present invention has been made on the basis of such discovery. Usually the air/fuel ratio value optimum for the activities of the three-way catalyst is the stoichiometric value. According to the invention, continuation of a lean-combustion high-exhaust temperature condition which is detrimental to the three-way catalyst can be quickly evaded by the aforementioned intentional change in the air/fuel ratio. Therefore, the three-way catalyst long retains its activities and contributes to sufficient reduction in exhaust emission, particularly in respect of NOx, while the merits of lean-combustion are obtained almost to a full extent.

DESCRIPTION OF THE PREFERRED EMBODIMENTS

Figure 1:
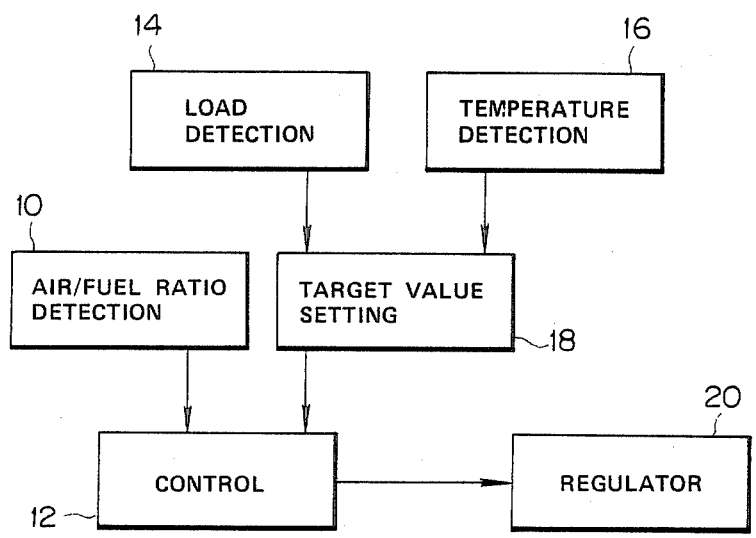
FIG. 1 is a block diagram showing the fundamental construction of an air/fuel ratio control system according to the invention.

FIG. 1 shows the functional connections between the principal elements of an air/fuel ratio control system according to the invention. This control system is applied to an internal combustion engine which is provided with a conventional three-way catalyst in the exhaust passage. The control system includes an air/fuel ratio detection means 10 to detect the actual air/fuel ratio in the engine by sensing, for example, the concentration of oxygen in the exhaust gas. An electronic control means 12 utilizes the air/fuel ratio signal produced by the detection means 10 to find any deviation of the actual air/fuel ratio from a target value and produces a fuel feed control signal, or an air intake control signal, which is supplied to an electromechanical means 20 for minutely regulating the ratio of air to fuel being taken into the engine. Furthermore, the air/fuel ratio control system includes a load detection means 14 to detect the load under which the engine is operating, a temperature detection means 16 to detect the temperature of the aforementioned three-way catalyst and a target value setting means 18 which receives information signals from both the load detection means 14 and the temperature detection means 16 and sets the target value of the air/fuel ratio control at an optimum value which is variable according to the engine operating conditions. In practical applications it is usual to incorporate the target value setting means 18 in the control unit 12. The target value is set at a super-stoichiometric value at least in a portion of a steady zone of the engine operating conditions, that is, at least in a predetermined range of medium-load and medium-speed conditions of the engine operation. According to the invention the control means 12 has the function of temporarily shifting the aim of the air/fuel ratio control from the target value set by the means 18. That is, if it is detected that the temperature of the three-way catalyst is above a predetermined temperature while the target value of the air/fuel ratio is set at a super-stoichiometric value, the control means 12 functions so as to decrease the actual air/fuel ratio to a predetermined value optimum for the activities of the three-way catalyst or to a still lower value.

As mentioned hereinbefore, the intentional decrease of the air/fuel ratio under high air/fuel ratio and high exhaust temperature conditions is performed for the purpose of preventing deterioration of the three-way catalyst and thereby maintaining a sufficiently low level of exhaust emission.

Figure 2:
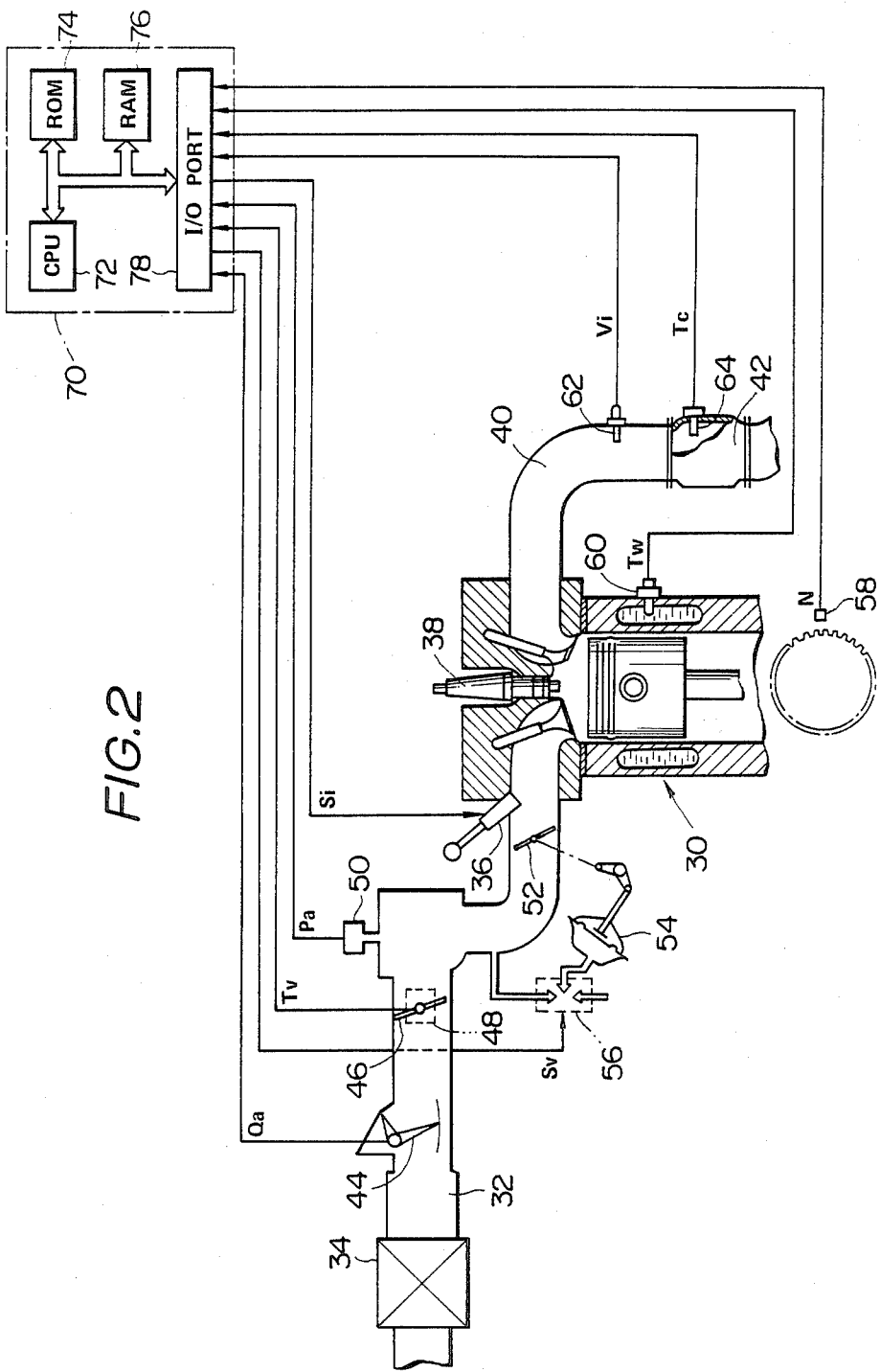
FIG. 2 is a diagrammatic illustration of an automotive engine provided with an air/fuel ratio control system as an embodiment of the invention.

As an embodiment of the invention, FIG. 2 shows an automotive internal combustion engine 30 provided with an air/fuel ratio control system which accomplishes its purpose by controlling the amount of fuel injection into the engine. In the usual manner an intake passage 32 extends from an air cleaner 34 to the cylinders of the engine 30, and an electromagnetically operated fuel injector 36 for each cylinder of the engine opens into the intake passage 32 at a section called an intake port. Numeral 38 indicates a spark plug provided to each cylinder. In an exhaust passage 40, a catalytic converter 42 occupies an intermediate section for purifying the exhaust gas by means of a conventional three-way catalyst, which exhibits its full activities when the engine is operated with an approximately stoichiometric air-fuel mixture.

In the intake passage 32 there is an airflow meter 44 of the flap type which produces a signal representative of the flow rate $Q_a$ of air admitted into the intake passage 32, and a sensor 48 is coupled with throttle valve 46 to provide a signal representative of the degree of opening $T_v$ of the throttle valve 46. A so-called swirl valve 52 is disposed in the intake pasage 32 at a section close to the intake ports. By the action of an external drive valve 54 the swirl valve 52 is opened and closed so as to create a swirl of the air-fuel mixture, which transmits through the intake ports to the engine cylinders and contributes to improved combustion. A solenoid valve 56 is coupled with the drive valve 54 to control the magnitude of negative pressure applied to the drive valve 54. A crank-angle sensor 58 is provided to produce a signal representative of the engine revolving speed N. In this embodiment the airflow meter 44 and the crank-angle sensor 58 constitute the load detection means 14 in FIG. 1. A temperature sensor 60 is disposed in the cooling water jacket to produce a signal representative of the cooling water temperature $T_w$.

An oxygen sensor 62 is inserted into the exhaust passage 40 at a section upstream of the catalytic converter 42 to estimate the actual air/fuel ratio in the engine cylinders from the concentration of oxygen in the exhaust gas. The oxygen sensor 62 can be selected from various conventional and recently developed oxygen sensors most of which utilize an oxygen ion conductive solid electrolyte. However, the oxygen sensor 62 is required to be effectively operative not only when the air/fuel ratio in the engine is nearly stoichiometric but also when the air/fuel ratio is considerably higher or lower than the stoichiometric ratio. It is preferable that the output voltage (or current) $V_i$ of the oxygen sensor 62 has a definite correlation with the actual air/fuel ratio in the engine over a wide range containing both sub-stoichiometric and super-stoichiometric regions.

A temperature sensor 64 is disposed in an inlet section of the catalytic converter 42. This sensor 64 serves as the temperature detection means 16 in FIG. 1. Since there is a known relationship between the exhaust temperature in the inlet section of the catalytic converter 42 and the temperature of the three-way catalyst in the converter 42, the signal produced by this sensor 64 represents the catalyst temperature $T_c$.

The air/fuel ratio control system of FIG. 2 has a control unit 70 in which the control means 12, target value setting means 18 and a part of the air/fuel ratio detection means 10 shown in FIG. 1 are integrated. This control unit 70 is a microcomputer comprised of CPU 72, ROM 74, RAM 76 and I/O port 78. The ROM 74 stores programs of operations of CPU 72. The RAM 76 stores various data to be used in operations of CPU 72, some of which are in the form of map or table. The signals produced by the above described sensors 44, 48, 50, 58, 60, 62 and 64 are input to the I/O port 78 and then to the CPU 72 according to the need. Based on the engine operating condtion information gained from these input signals the control unit 70 provides a fuel injection signal $S_i$ to the injectors 36 so as to adjust the air/fuel ratio to a target value. The target value of air/fuel ratio is considerably higher than the stoichiometric ratio when the engine operating condition is within a predetermined steady operation range. Besides, the control unit 70 provides a swirl control signal $S_v$ to the solenoid valve 56 and an ignition timing control signal (omitted from illustration) for activation of the spark plugs 38.

In the control unit 70 an optimum amount of fuel injection, $T_i$, is computed according to the following equation (1) to perform feedback control of air/fuel ratio. In the fuel injection signal $S_i$ which the control unit 70 supplies to each injector 36 the amount of fuel injection $T_i$ is indicated by pulse width.

$$T_1 = Q_A \times R_T \times C_f \times A_f + T_s \tag{1}$$

wherein $Q_A$ represents the flow rate of intake air for each cylinder of the engine, $R_T$ is a target value of air/fuel ratio under feedback control and is widely variable, mainly in a so-called lean-burn region, according to the engine operating conditions and the degree of engine warm-up, $C_f$ is a correction factor for appropriately increasing the value of $T_i$ mostly under predetermined transient conditions, and also under predetermined lean-burn high-temperature conditions explained hereinafter, with consideration of evaporation of a portion of the fuel and liquefaction of another portion of the fuel on the wall surfaces in the intake port, $A_f$ is a feedback correction factor for cancellation of any deviation of the detected air/fuel ratio from the target value $R_T$, and $T_s$ is a supplement for compensation of a deviation of the actual duration of fuel injection from the pulse width in the fuel injection signal $S_i$.

During steady operation of the engine the air flow rate $Q_A$ in the equation (1) is computed from the output of the airflow meter 44 with a correction according to the temperature of intake air. Under a transient operating condition of the engine, further corrections are made based on the degree of throttle valve opening $T_v$ and the pressure of air $P_a$ measured with the sensor 50. It is desirable to compute $Q_A$ with such minute corrections to thereby obtain very accurate information on the air flow rate, because otherwise it is difficult to accomplish very precise control of air/fuel ratio by truly optimizing the amount of fuel injection. The computation of $Q_A$ will be described in detail at the end of description of the present embodiment.

Figure 3:
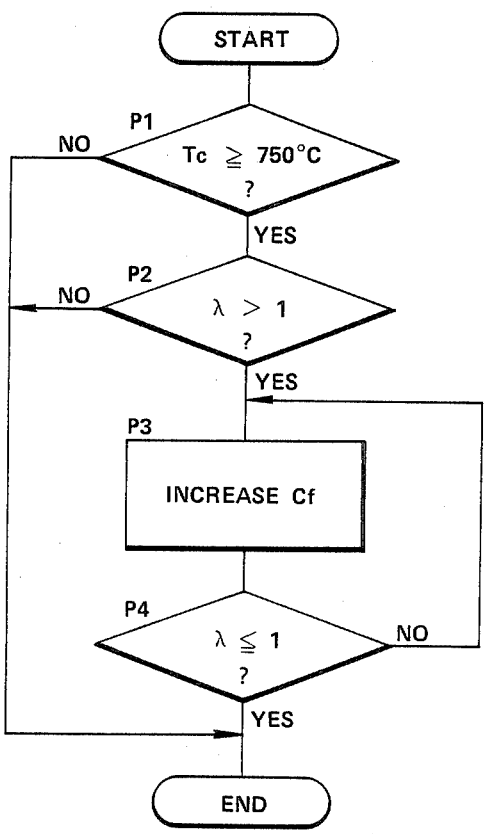
FIG. 3 is a flowchart showing a computer program stored in a microcomputer included in the air/fuel ratio control system of FIG. 2.

FIG. 3 is a flowchart showing one of the computer programs stored in the ROM 74 of the control unit 70. This program is repeatedly executed at predetermined constant time intervals to increase, in case of need, the value of the correction factor $C_f$ used in the equation (1).

The initial step P1 is determining whether the temperature $T_c$ of the three-way catalyst has reached 750° C. or not. If the catalyst temperature $T_c$ is lower than 750° C. the program ends without changing the value of $C_f$. If $T_c$ is 750° C. or above, the next step P2 is determining whether the target value of air/fuel ratio under feedback control is higher than the stoichiometric ratio (which is optimum for the activities of the three-way catalyst) or not. In the flowchart air/fuel ratio is represented by the excess air factor $\lambda$, which is equal to 1 (one) under the stoichiometric condition and is greater than 1 under super-stoichiometric conditions. For the three-way catalyst used in the embodiment now described, the optimum value of $\lambda$ is 1. If the value of $\lambda$ is not greater than 1 the program ends without changing the value of $C_f$. If $\lambda$ is greater than 1 while the catalyst temperature $T_c$ is 750° C. or above (such a condition is referred to as the lean-burn high-temperature condition), the program proceeds to step P3 where the correction factor $C_f$ is increased by a predetermined amount. When $C_f$ is increased the next step P4 is checking whether or not $\lambda$ has lowered to 1 or below, i.e. checking whether or not the air/fuel ratio has reached a value optimum for the activities of the three-way catalyst or a still lower value. If $\lambda$ is 1 or below the program comes to an end. If $\lambda$ is still greater than 1, the program returns to the step P3 to further increase $C_f$.

As the program of FIG. 3 is executed, the amount of fuel injection $T_i$ is soon increased when the lean-burn high-temperature condition is created. The amount of the increase becomes greater as the difference between the target value of air/fuel ratio under feedback control and the stoichiometric ratio is greater. Consequently the actual air/fuel ratio rapidly decreases to the stoichiometric ratio or a sub-stoichiometric ratio, so that the lean-burn high-temperature condition vanishes. Therefore, even though the catalyst temperature $T_c$ is still 750° C. or above the three-way catalyst exhibits its full activities without suffering from deterioration of the function of Rh as an essential element of the catalyst. Naturally exhaust emission is very reduced particularly in respect of NOx.

Figure 4:
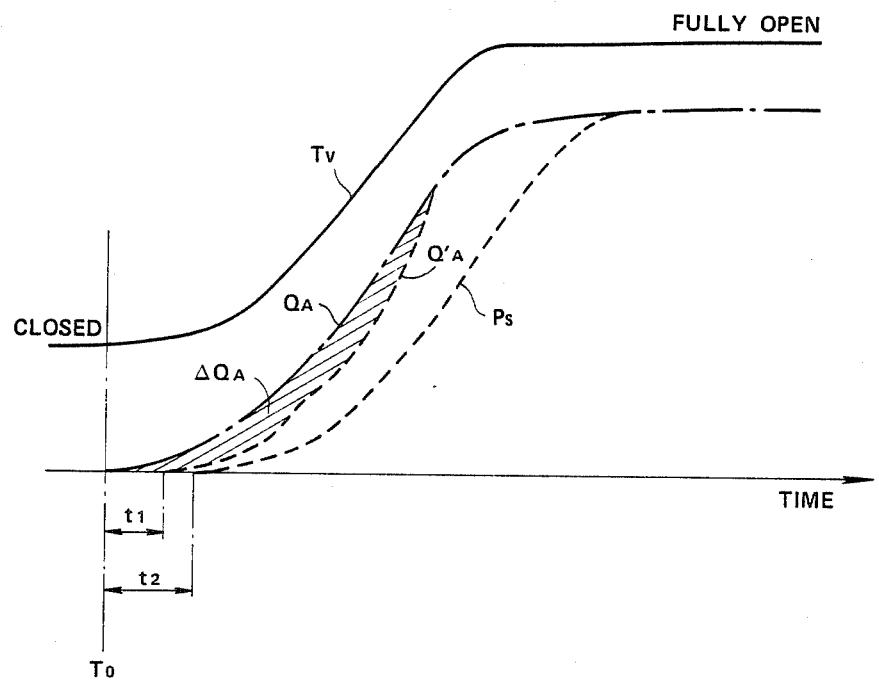
FIG. 4 is a chart for explanation of the manner of computing the flow rate of air taken into each cylinder of the engine in the air/fuel ratio control system of FIG. 2.

Referring to FIG. 4, the air flow rate $Q_A$ for each cylinder of the engine is computed preferably by the following process in the case of, for example, acceleration of the engine.

At the time-point $T_0$ the throttle valve begins to move away from its fully closed position so that the degree of throttle valve opening $T_v$ begins to change. Accordingly the pressure of intake air measured with the sensor 50 in FIG. 2 begins to vary. In FIG. 4 the air pressure is represented by $P_s$ which is the waveform of an electrical signal obtained by treating the output of the pressure sensor 50. The air pressure signal $P_s$ begins to vary with a time delay $t_2$ by reason of a pulsation suppressing effect. The curve $Q_A'$ represents an air flow rate for each cylinder of the engine calculated from the value of $P_s$ with a correction considered to be appropriate. The value of $Q_A'$ begins to change with a time delay $t_1$ ($t_1 < t_2$) from the time-point $T_0$. The curve $Q_A$ represents the actual flow rate of air into each cylinder. There is a difference $\Delta Q_A$ indicated by the hatched area between the actual flow rate $Q_A$ and the calculated flow rate $Q_A'$. This means inaccuracy of the detection of the air flow rate under a transient operating condition of the engine. Such inaccuracy is corrected by the following operations.

First, $Q_A'$ is computed according to the following equation (2).

$$Q_A' = P_s + a\Delta P_a \tag{2}$$

wherein $a$ is a function of the engine revolving speed N, and $\Delta P_a$ is a difference in the intake air pressure $P_a$ in a predetermined unit time.

In computing $Q_A'$ the equation (2) is employed with consideration of the fact that inflow of air into each cylinder of the engine lasts even after completion of intake of fuel.

To cancel the difference $\Delta Q_A$ indicated by the hatched area in FIG. 4, the magnitude of $\Delta Q_A$ is estimated by calculation according to the following equation (3) with particular attention to the degree of throttle valve opening $T_v$ which begins to vary first.

$$\Delta Q_A = (\Delta T_v / N) \times Q_{AI} \quad (3)$$

wherein $Q_{AI}$ is the air flow rate ($Q_A$) at the initial stage of the transition from steady-state to acceleration and can be determined, for example, from the change in the degree of throttle valve opening $T_v$.

The thus computed $\Delta Q_A$ is added to the air flow rate $Q_A'$ calculated from the outputs of the aforementioned sensors by using the equation (2) since the actual air flow rate $Q_A$ is assumed to be $Q_A' + \Delta Q_A$. In FIG. 4 the curve $Q_A$ represents the result of this calculation process, and this curve can be regarded as accurately representative of the actual air flow rate because there is good correlation between the degree of throttle opening $T_v$ and the air flow rate $Q_A$ represented by this curve. Thus, estimation of the air flow rate $Q_A$, i.e. amount of air taken into each cylinder of the engine, is accomplished with very improved accuracy. Of course, such improved accuracy can be attained in the case of deceleration too. As the air flow rate $Q_A$ is accurately estimated the amount of fuel injection $T_i$ can be determined very accurately by the equation (1) and therefore feedback control of the air/fuel ratio can accurately be accomplished.

After a while the air flow rate $Q_A'$ given by the equation (2) will accord with $P_s$. After that the actual air flow rate $Q_A$ with respect to each cylinder can be calculated simply from either the output of the airflow meter 44 located upstream of the throttle valve or the output of the pressure sensor 50 located downstream of the throttle valve without need of computing $\Delta Q_A$.

Figure 5:
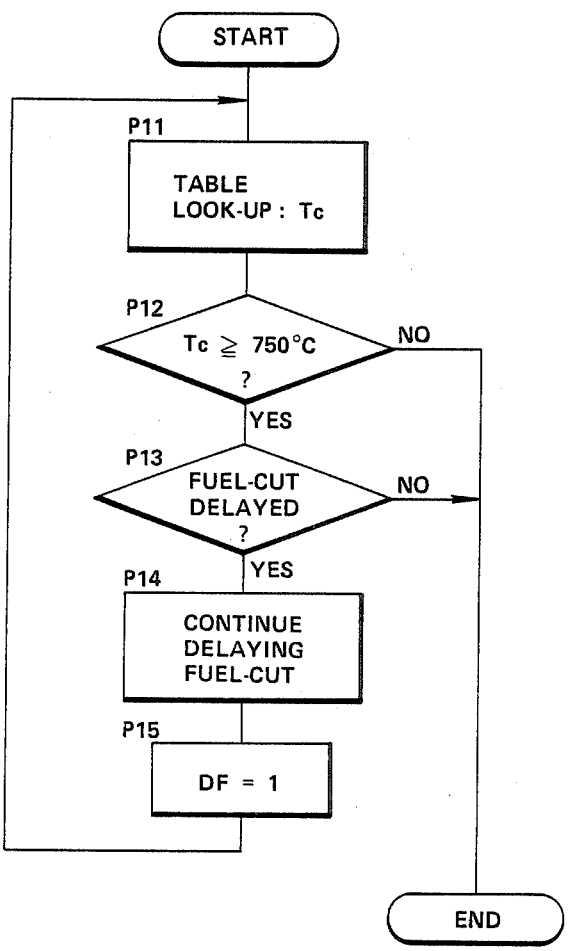
FIG. 5 is a flowchart showing a computer program stored in a microcomputer included in another embodiment of the invention.

FIG. 5 shows a computer program as another embodiment of the temperature detection means 16 and control means 20 in FIG. 1.

The initial step P11 is finding temperature $T_c$ of the three-way catalyst by look-up of a two-dimensional table map which is stored in the RAM 76 of the contol unit and in which the widely variable operating conditions of the engine are divided into many zones to show credible values of the catalyst temperature $T_c$ in the respective zones. The table map is prepared by using experimental results. Therefore, real-time finding of the catalyst temperature $T_c$ is possible without need of actually measuring the temperature in the catalytic converter 42.

In this embodiment the amount of fuel injection $T_i$ is controlled so as to render the air/fuel ratio stoichiometric or sub-stoichiometric in high-temperature zones where the catalyst temperature $T_c$ reaches 750° C. or above. That is, in such high-temperature zones the feedback control of air/fuel ratio is converted to feed-forward control to unconditionally decrease the value of $\lambda$ to 1 or a still lower value. By this method the desired lowering of air/fuel ratio under the high-temperature condition is accomplished very quickly so that prevention of deterioration of the three-way catalyst is further ensured.

The next step P12 of the program is checking whether or not the instant zone of the engine operating conditions is one where the catalyst temperature $T_c$ reaches 750° C. or above. If the answer is negative the program ends without doing further operations. If the answer is affirmative the next step P13 is checking whether fuel-cut (interruption of fuel feed) is being delayed or not. This operation is included because if fuel-cut is effected the catalyst temperature $T_c$ is not lower than 750° C. it is inevitable that the atmosphere in the exhaust passage becomes analogous to the exhaust gas under the lean-burn high-temperature condition. If the answer at the step P13 is negative, the program comes to an end. If the answer is affirmative the next step P14 is poviding a command to continue delaying fuel-cut, and at the next step P15 a delay flag DF is set. Then the program returns to the initial step P11.

The method illustrated in FIG. 5 is advantageous because it is possible to prevent deterioration of the performance of the three-way catalyst over a very wide range of engine operating conditions including fuel cut conditions.

What is claimed is:

1. A control system for feedback control of the air/fuel ratio of an air-fuel mixture supplied to an internal combution engine which uses a three-way catalyst for purifying the exhaust gas, the control system comprising:

air/fuel ratio detection means for detecting actual values of air/fuel ratio in the engine;

load detection means for detecting the load under which the engine is operating;

temperature detection means for detecting the temperature of the three-way catalyst; and control means for performing feedback control of the feed of fuel or air to the engine based on the detected actual values of air/fuel ratio, the control means comprising target value setting means for determining a variable target value of the air/fuel ratio according to information obtained by said load detection means such that the target value becomes higher than the stoichiometric air/fuel ratio at least in a portion of a steady zone of operating conditions of the engine and modification means for varying the feed of fuel or air to the engine when the temperature of the three-way catalyst is above a predetermined temperature while the target value of feedback control of air/fuel ratio is higher than the stoichiometric ratio such that the actual air/fuel ratio decreases to a predetermined value which is optimum for the activities of the three-way catalyst or to a still lower value.

2. A control system according to claim 1, wherein said predetermined temperature is about 750° C.

3. A control system according to claim 1, wherein said predetermined value of the air/fuel ratio is approximately equal to the stoichiometric air/fuel ratio.

4. A control system according to claim 1, wherein at least said control means, a part of said air/fuel ratio detection means, a part of said load detection means and said temperature detection means are integrated in a microcomputer.

5. A control system according to claim 4, wherein said temperature detection means comprises a group of data which is stored in said microcomputer and indicates an experimentally determined temperature of the three-way catalyst for each of a plurality of zones of operating conditions of the engine.

6. A control system according to claim 1, wherein said air/fuel ratio detection means comprises means for sensing the concentration of oxygen in the exhaust gas.

* * * * *